United States Patent [19]
Pei

[11] Patent Number: 5,406,620
[45] Date of Patent: Apr. 11, 1995

[54] METHOD OF ALLOCATING INTERNATIONAL TRANSIT TRAFFIC AMONG A PLURALITY OF CARRIERS IN A TERMINATING COUNTRY

[75] Inventor: Eric T. Pei, Lawrenceville, N.J.

[73] Assignee: AT&T Bell Laboratories, Murray Hill, N.J.

[21] Appl. No.: 166,479

[22] Filed: Dec. 14, 1993

[51] Int. Cl.$^6$ ............................................. H04M 7/12
[52] U.S. Cl. ..................................... 379/220; 379/219; 379/221
[58] Field of Search ............... 379/220, 219, 221, 222, 379/223

[56] References Cited

U.S. PATENT DOCUMENTS

| | | | |
|---|---|---|---|
| 4,555,594 | 11/1985 | Friedes et al. | 379/235 |
| 4,565,903 | 1/1986 | Riley | 379/201 |
| 4,577,066 | 5/1986 | Bimoute et al. | 379/221 |
| 4,611,096 | 9/1986 | Asmuth et al. | 379/230 |
| 4,862,496 | 8/1989 | Kelly et al. | 379/221 |
| 5,063,592 | 11/1991 | Cannella et al. | 379/219 |
| 5,239,542 | 8/1993 | Breidenstein | 379/353 |
| 5,311,585 | 5/1994 | Armstrong et al. | |

Primary Examiner—James L. Dwyer
Assistant Examiner—Michael N. S. Lau

[57] ABSTRACT

Disclosed is a system for allocating international transit calls among a plurality of carriers in a terminating country in accordance with routing information that has been previously specified by the originating carrier. Originating carriers may select one of a plurality of routing treatment options which specify how international transit calls should be allocated among the plurality of carriers serving a given terminating country. Carrier treatment tables maintain the routing information specified by each originating carrier for each terminating country. Upon receipt of an international transit call, an originating gateway switch can access the appropriate carrier treatment table and retrieve the routing information specified by the originating carrier for the indicated terminating country. In this manner, a terminating carrier can be selected to receive the transit call based on the routing information previously specified by the originating carrier.

27 Claims, 11 Drawing Sheets

FIG. 3A

| Terminating Carrier FAI Value | Allocated Percentage (%) | Routing Table Pointer | Overflow Carrier(s) |
|---|---|---|---|
| FAI1 (KDD) | -- | MRT1 | -- |

| Terminating Carrier FAI Value | Allocated Percentage (%) | Routing Table Pointer | Overflow Carrier(s) |
|---|---|---|---|
| FAI1 (KDD) | -- | MRT1 | FAI2 (ITJ), FAI3 (IDC) |
| FAI2 (ITJ) | -- | MRT2 | FAI3 (IDC) |
| FAI3 (IDC) | -- | MRT3 | -- |

| Terminating Carrier FAI Value | Allocated Percentage (%) | Routing Table Pointer | Overflow Carrier(s) |
|---|---|---|---|
| FAI1 (KDD) | 55% | MRT1 | FAI3 (IDC) |
| FAI2 (ITJ) | 25% | MRT2 | FAI1 (KDD), FAI3 (IDC) |
| FAI3 (IDC) | 20% | MRT3 | FAI2 (ITJ) |

304 → Terminating Carrier FAI Value
308 → Allocated Percentage
312 → Routing Table Pointer
316 → Overflow Carrier(s)
344 → FAI1 row
348 → FAI2 row
352 → FAI3 row
360 → table

FIG. 4A

| Terminating Gateway Switch Identification Number | Initial Try Probability |
|---|---|
| Switch 110 | 25% |
| Switch 120 | 15% |
| Switch 130 | 20% |
| Switch 140 | 40% |

410 → table
415 → Terminating Gateway Switch Identification Number
420 → Initial Try Probability
425 → Switch 110
430 → Switch 120
435 → Switch 130
440 → Switch 140

| Route Identification Number | Initial Try Probability |
|---|---|
| Trunk 150 | 100% |
| Switch 120 | -- |
| Switch 130 | -- |
| Switch 140 | -- |

FIG. 4B

| Terminating Country Code (CC) | Default Routing Information | SINGLE Carrier Flag |
|---|---|---|
| CC1 (Country 35) | Switch 100 | 1 |
| CC2 (Country 80) | Switch 110 | 1 |
| CC3 (Country 65) | Default Table Pointer | 0 |
| ⋮ | | |
| CCn | | |

FIG. 5

METHOD OF ALLOCATING INTERNATIONAL TRANSIT TRAFFIC AMONG A PLURALITY OF CARRIERS IN A TERMINATING COUNTRY

FIELD OF THE INVENTION

The present invention relates to the routing of international telephone calls, and more particularly, to a system for allocating international transit calls among a plurality of carriers in a terminating country in accordance with routing information previously specified by the originating carrier.

BACKGROUND OF THE INVENTION

Due to the configuration of international telephone networks, a telephone carrier in a first originating country desiring to route a call to a second terminating country, will often have to route the call by means of one or more transit carriers in intermediate countries. The routing of international transit calls is often a desirable source of revenue for the transit carrier.

Presently, if the terminating country is served by a plurality of telephone carriers, it is the transit carrier who determines which carrier in the terminating country should handle the call. Typically, the transit carrier will allocate received international transit calls among a plurality of carriers in the terminating country in the same manner as calls that are generated within the transit country that are destined for the terminating country, i.e., by utilizing the well known Carrier Proportioned Routing (CPR) method.

Carrier Proportioned Routing allocates a "fair" amount of telephone traffic to each carrier in a foreign terminating country based on proportions that are consistent with the amount of telephone traffic that the transit carrier receives from the various carriers in the respective terminating country.

While Carrier Proportioned Routing provides an effective basis for a transit carrier to allocate international transit traffic among a plurality of terminating carriers, it does not allow the originating carrier to designate how international transit calls should be routed.

Increasingly, international telephone carriers are entering contractual arrangements that specify how calls that are destined for various terminating countries should be allocated among the plurality of carriers that may serve the respective country. These contractual arrangements are typically based on the relative percentage of telephone traffic that the originating carrier receives from the various carriers in the respective terminating country.

As is apparent from the above deficiencies with the prior art, a need exists for a routing system that is capable of honoring and enforcing the contractual arrangements entered by an originating carrier specifying how international transit calls should be allocated among a plurality of carriers in a particular terminating country.

SUMMARY OF THE INVENTION

Generally, according to one aspect of the invention, a transit carrier in a transit country can allocate international transit calls among a plurality of carriers in a terminating country in accordance with routing information that has been previously specified by the originating carrier for the respective terminating country.

Another aspect of the invention allows the originating carrier to specify a particular routing treatment option for each terminating country. According to a first routing treatment option, the mandatory (M) option, the originating carrier can designate a terminating carrier in a given terminating country to receive all transit calls destined for the terminating country without exception. According to a second routing option, the preference (P) option, the originating carrier can specify an order of preference for each of the designated terminating carriers in a given terminating country. Finally, according to a third routing option, the proportional or percentage (%) option, the originating carrier can allocate transit calls among designated terminating carriers in a given terminating country according to predetermined percentages.

Another aspect of the invention provides a system for supplying the routing information specified by each originating carrier to each originating gateway switch of the transit carrier. A carrier treatment table is maintained for each originating carrier and terminating country pair, for storing the routing information that has been previously specified by the originating carrier for the respective terminating country.

An Originating Carrier Terminating Country Pair (OCTCP) table, indexed by originating carrier and terminating country, is additionally maintained for access by each originating gateway switch. Each entry in the OCTCP table will include a pointer to the carrier treatment table that corresponds to each particular originating carrier and terminating country pair.

Upon receipt of an international transit call destined for a terminating country served by a plurality of carriers, an originating gateway switch will initially process the call and identify the originating country and carrier, as well as the respective terminating country. The originating gateway switch will then access the entry in the OCTCP table appropriate for the indicated originating carrier and terminating country and retrieve the pointer to the appropriate carrier treatment table.

The originating gateway switch will then access the appropriate carrier treatment table and retrieve the routing information previously specified by the originating carrier for the respective terminating country. A terminating carrier will be selected based upon the routing information retrieved from the carrier treatment table. The originating gateway switch will then attempt to route the international transit call to the selected terminating carrier.

A more complete understanding of the present invention may be had by reference to the following Detailed Description with the accompanying drawings.

BRIEF DESCRIPTION OF FIGURES

FIGS. 3A through 3C illustrate carrier treatment tables for the mandatory (M), preference (P) and proportional (%) routing options, respectively;

FIGS. 4A and 4B are routing tables that contain information for routing a call by an originating gateway switch and a terminating gateway switch, respectively;

FIG. 5 illustrates a terminating country list that maintains default routing information for each terminating country;

DETAILED DESCRIPTION

Figure 1:
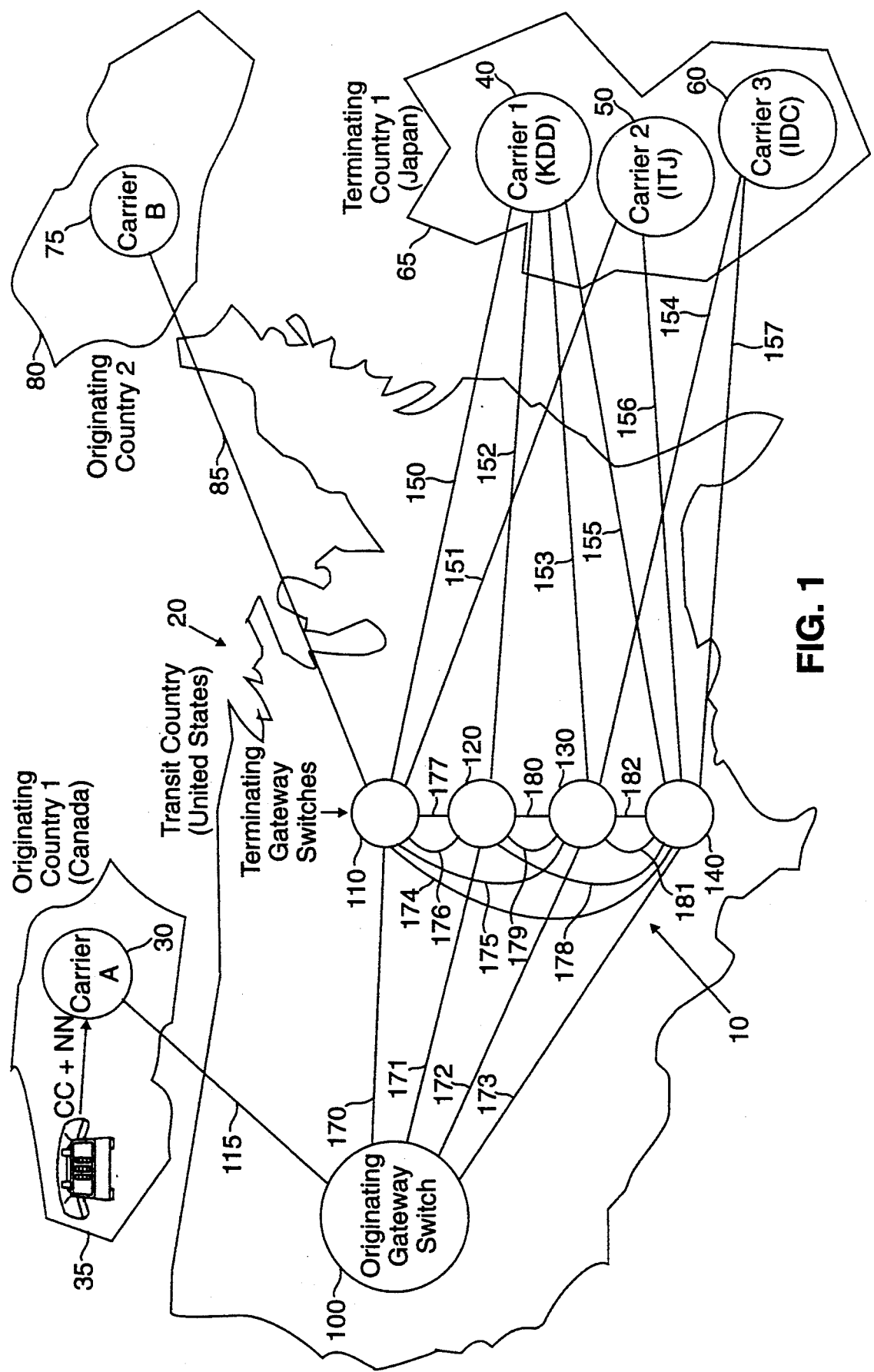
FIG. 1 is a schematic block diagram illustrating a simplified telephone network for transferring international transit calls.

FIG. 1 shows a simplified network for transferring international transit calls, i.e., telephone calls that originate from an originating country 35, such as Canada, and terminate to a terminating country 65, such as Japan, via a switched transit network 10 in a transit country 20, such as the United States. In the illustrative communications network of FIG. 1, calls are received by the transit network 10, such as AT&T's communications network, from an originating carrier 30, such as Teleglobe, in the originating country 35, such as Canada, at an originating gateway switch 100 of the transit network 10 via a trunk group 115. Similarly, calls destined for the foreign terminating country 65, such as Japan, are routed by the transit network 10 to a terminating carrier, such as carrier 40, KDD; carrier 50, ITJ; or carrier 60, IDC; in the terminating country 65 by means of a plurality of terminating gateway switches 110, 120, 130, 140 via trunk groups 150–157.

The originating and terminating gateway switches, such as switches 100, 110, 120, 130, 140, are telecommunications switches, such as AT&T's 4ESS TM switch, discussed further below. The illustrated transit network 10 includes trunk groups 170–182 for interconnecting the originating and terminating gateway switches to one another, as shown in FIG. 1. It is noted that while each individual trunk group 170–182 interconnecting the gateway switches is illustrated as a single, direct route, one or more of the trunk groups may actually consist of a combination of trunks and switches.

A call received by the originating gateway switch 100 includes sufficient information to identify the originating country and carrier, as well as the terminating country, as is known in the art. The particular originating country may be identified in two ways. First, the individual trunk subgroups arriving at an originating gateway switch 100 may be mapped to the particular country, city and/or international carrier connected to that trunk subgroup. Thus, for the illustrated embodiment of FIG. 1, all calls received at the originating gateway switch 100 via trunk subgroup 115 are known to be received from carrier 30 of originating country 35.

Second, the call information transmitted by an originating carrier with a call contains header fields conforming to international standards that can identify the originating country. Thus, the originating country may be identified by analyzing the originating country code (CC) field included with the call information, according to international numbering standards. Furthermore, an indication of the originating carrier may be included in the originating Foreign Administration Identity (OFAI) parameter field provided with the trunk information. As is known, each carrier in a particular country may be assigned a unique FAI value by the transit carrier identifying that particular carrier.

The terminating country associated with a particular call may be identified by analyzing the telephone number dialed by the caller in the originating country, in a known manner. The dialed terminating country code (CC) may be decoded according to international numbering standards.

According to a feature of the invention, a transit carrier, such as AT&T, in the transit country 20 will route incoming international transit calls to terminating carriers, such as carriers 40, 50, 60 in terminating country 65, in accordance with the routing treatment that has been previously specified by the originating carrier, such as carrier 30, for the particular terminating country 65.

Preferably, originating carriers can select one of a plurality of routing treatment options for each terminating country. According to a first routing treatment option, hereinafter referred to as the mandatory (M) option, the originating carrier can designate a terminating carrier in a particular terminating country to receive all calls without exception. Thus, all routing searches to the terminating country should be confined only to direct routes between the transit carrier and the designated primary terminating carrier. If there are no routes available to the designated carrier, the call cannot be routed by the transit carrier and will thus be "final handled," i.e., terminated.

According to a second routing treatment option, hereinafter referred to as the preference (P) option, the originating carrier can indicate an order of preference for each of the designated terminating carriers. Routing attempts start with an indicated primary or most preferred carrier. Only after all routes to the primary carrier are exhausted will the secondary carrier be attempted. This process is continued until the call is routed successfully or all designated carriers have been attempted, whereupon the call will be final handled.

According to a third routing treatment option, hereinafter referred to as the proportional (%) option, the originating carrier can allocate calls among the designated carriers of a particular terminating country according to indicated percentages. The originating carrier will assign an initial attempt percentage to each designated terminating carrier, and may optionally provide an overflow indicator pointing to the next carrier to try in the event that all routes to the originally selected carrier are exhausted. The originating gateway switch 100 will assign the transit call to one of the designated terminating carriers 40, 50, 60 based upon a process that results in the relative frequency of initial assignment to each designated carrier being equal to the indicated initial attempt percentage for the respective carrier for a statistically significant number of calls.

In order to route international transit calls according to the principles of the present invention, each originating gateway switch 100 must have access to the routing information that has been specified by each originating carrier for each terminating country. The specified routing information may be stored in distributed databases associated with each originating gateway switch 100, as discussed below, or in a central, remote, database that may be accessed by each originating gateway switch 100.

It is noted that if international standards controlling the allocation of call header fields were modified in the future to provide additional header fields, such as fields for selected terminating carrier FAI value and for overflow carrier FAI values, the routing procedures described below could be performed on a per-call basis. Thus, the appropriate routing treatment could be specified in these additional header fields by the originating carrier for each call, and need not be specified for all calls to a particular terminating country in advance.

In the following discussion, the term "originating carrier terminating country pair" may be abbreviated by the acronym "OCTCP". Preferably, the routing information for each OCTCP is stored locally in each originating gateway switch 100 in carrier treatment tables 320, 340, 360, illustrated in FIGS. 3A through 3C and discussed further below.

Figure 2:
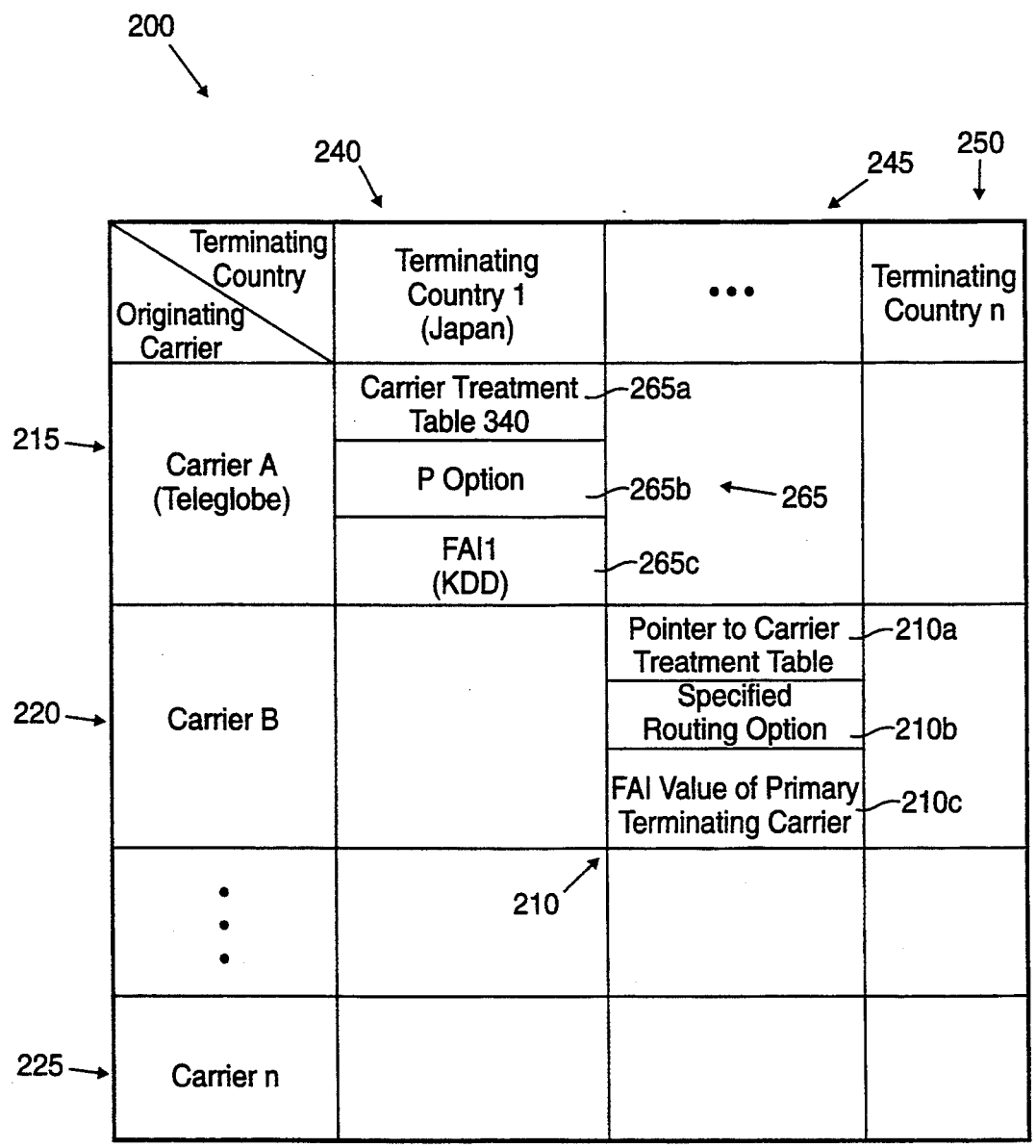
FIG. 2 illustrates an originating carrier terminating country pair table that maintains routing information for each originating carrier and terminating country.

In order to identify the appropriate carrier treatment table 320, 340, 360 to be utilized for a particular OCTCP, an indexed Originating Carrier Terminating Country Pair (OCTCP) table 200, illustrated in FIG. 2, is maintained by each originating gateway switch 100. As illustrated in FIG. 2, the OCTCP table 200 can be visualized as a two-dimensional array or matrix of data, with the originating carriers providing the headings for each row, such as rows 215, 220, 225, and the terminating countries providing the headings for each column, such as columns 240, 245, 250. Each multi-valued entry, such as entries 210, 265, in the OCTCP table 200 is thereby associated with a particular originating carrier and terminating country pair. Each multi-valued entry, such as entry 210, in the matrix includes a cell 210a containing a pointer to the address of the carrier treatment table 320, 340, 360 appropriate for this pair, a cell 210b containing the routing option specified by the originating carrier for the terminating country 65 (M, P or % option) and a cell 210c containing, where appropriate, the FAI value of the primary terminating carrier.

In the illustrated embodiment of FIG. 2, entry 265 contains the routing information specified by originating carrier 30, such as the carrier Teleglobe, from originating country 35, such as Canada, for international transit calls destined for terminating country 65, such as Japan, which has three international carriers: carrier 40, KDD; carrier 50, ITJ; and carrier 60, IDC. Thus, when a call is received from Teleglobe, on trunk subgroup 115, destined for Japan, cell 265a indicates that the originating gateway switch 100 should access the carrier treatment table 340, illustrated in FIG. 3B. In addition, Teleglobe has specified the preference (P) routing option for calls destined for Japan, as indicated in cell 265b, and that KDD should be the primary terminating carrier, as indicated in cell 265c.

It is noted that the primary terminating carrier cell, such as cells 210c, 265c, will be populated only where the mandatory (M) or preference (P) option has been specified. The mandatory (M) and preference (P) options both confine all routing searches to the terminating country, at least initially, to direct routes between the transit carrier and the designated primary terminating carrier, as discussed above. The proportional (%) routing option, on the other hand, allocates a transit call to a terminating carrier based on designated percentages.

In certain cases, originating carriers, such as carrier 30, may not need or desire to specify routing information for some or all terminating countries, i.e., where the terminating country is served by only a single carrier or where an originating carrier has not entered contractual agreements for certain terminating countries. If an originating carrier has not designated specific routing information to be utilized in routing transit calls to a particular terminating country, the associated multi-valued entry 210 in the OCTCP table 200 should remain unpopulated.

In addition, in order to provide a convenient mechanism for distinguishing those originating carriers that have not designated specific routing treatment for even a single terminating country, an Originating Carrier Participation (OCP) flag is preferably associated with each originating carrier. A first predetermined value of this flag indicates that the associated originating carrier has specified a routing treatment for at least one terminating carrier, while a second predetermined value indicates that the originating carrier has not specified a routing treatment for any terminating carrier. The OCP flag may be embodied as a toggle switch provided on the trunk subgroup, such as trunk subgroup 115, associated with the respective originating carrier, such as carrier 30, or alternatively, may be embodied as an array of values indexed by originating carrier FAI values.

When an international transit call is received by the originating gateway switch 100 for which the originating carrier 30 has not previously designated specific routing information, the call should be handled in accordance with conventional routing practices. As discussed further below, a transit carrier will typically route such an international transit call in the same manner as calls that originate within the transit country. For a discussion of conventional routing practices, see U.S. patent application, Ser. No. 07/868,632, filed Apr. 14, 1992, now U.S. Pat. No. 5,311,585, issued May 10, 1994, entitled "Carrier Proportioned Routing," assigned to the assignee of the present invention and incorporated herein by reference.

An alternate embodiment (not shown) of the OCTCP table 200 allows an originating carrier to designate different routing treatments to the same terminating country for each of the different types of traffic services that the carrier provides. For example, an originating carrier may want one carrier to be the primary terminating carrier for its voice traffic to a terminating country and a second carrier to be the primary terminating carrier for its data traffic to that country. Thus, in this alternate embodiment, the OCTCP table 200 may be embodied in a visual sense as a three-dimensional array with the traffic service type providing the headings for the depth of the array in building upon the basic two-dimensional array discussed above. In this manner, unique entries can be provided in the OCTCP table 200 for each specific service provided by an originating carrier to a terminating country.

The carrier treatment tables 320, 340, 360, illustrated in FIGS. 3A through 3C, will preferably each have a Terminating Carrier FAI value column 304, an Allocated Percentages (%) column 308, a Routing Table Pointer column 312 and an Overflow Carriers column 316. However, as will be discussed further below, the carrier treatment tables 320, 340, 360 associated with certain of the routing options will not utilize all of the columns. The rows of each carrier treatment table are indexed by terminating carrier FAI value and are each associated with a designated terminating carrier from the respective terminating country.

If an originating carrier, such as carrier 30, has designated the mandatory (M) routing option for calls destined for a terminating country, such as country 65, Japan, then a carrier treatment table 320 similar to the one illustrated in FIG. 3A should be utilized. As indicated above, all routing searches for the mandatory (M) option should be confined only to direct routes between the transit carrier and the single designated terminating carrier. For illustrative purposes, assume that originating carrier 30 has designated the mandatory (M) routing option for terminating country 65, such as Japan, and has indicated that the primary terminating carrier 40 should be KDD, having an FAI of FAI1.

Thus, as illustrated in FIG. 3A, an appropriate carrier treatment table 320 for the mandatory (M) routing option will have only a single row 324 having the FAI value of the designated primary terminating carrier 40, such as KDD, in the first column 304. The entry in the corresponding Routing Table Pointer column 312 will include a pointer to the appropriate routing table, such as table 410 or 430, as discussed below relative to FIGS. 4A and 4B, which contains the necessary information for routing calls to the designated terminating carrier 40. The Allocated Percentages (%) column 308 and Overflow Carriers column 316 will remain unpopulated or can be ignored.

If an originating carrier, such as carrier 30, has designated the preference (P) routing option for calls destined for a terminating country, such as country 65, Japan, then a carrier treatment table 340 similar to the one illustrated in FIG. 3B should be utilized. As indicated above, all routing searches for the preference (P) routing option will begin with the designated primary or most preferred carrier and continue in line to each indicated alternate carrier until an available route is successfully obtained or the call is final handled. For illustrative purposes, assume that originating carrier 30 has designated the preference (P) routing option for a terminating country 65, such as Japan, and has indicated that the primary terminating carrier should be terminating carrier 40, KDD, followed in order by terminating carrier 50, ITJ, and terminating carrier 60, IDC.

Thus, as illustrated in FIG. 3B, an appropriate carrier treatment table 340 for the preference (P) routing option will include rows, such as rows 328, 332, 336, associated with each designated terminating carrier, with the terminating carriers populating the table in the order of preference indicated by originating carrier 30. The FAI value of each designated terminating carrier will be indicated in the first column 304. The entry in the Routing Table Pointer column 312 will identify the appropriate routing table, such as table 410 or 430, as discussed below relative to FIGS. 4A and 4B, for routing calls to the associated terminating carrier. The Overflow Carriers column 316 for each terminating carrier is populated with the FAI values of the carriers to be tried in order if a route is unavailable to the initially selected carrier. The Allocated Percentages (%) column 308 will remain unpopulated or can be ignored.

If an originating carrier, such as carrier 30, has designated the proportional (%) routing option for calls destined for a terminating country, such as country 65, Japan, then a carrier treatment table 360 similar to the one illustrated in FIG. 3C should be utilized. As indicated above, all routing searches for the proportional (%) routing option will be performed in accordance with percentages indicated by the originating carrier 30. Optionally, the originating carrier can designate overflow carriers to handle the call if no routes are available to the initially selected carrier. For illustrative purposes, assume that originating carrier 30 has designated the proportional (%) routing option for terminating country 65, such as Japan, and has allocated calls among the plurality of carriers 40, 50, 60 in terminating country 65 according to the following percentages: terminating carrier 40, KDD, should receive 55% of the calls, terminating carrier 50, ITJ, should received 25% of the calls and terminating carrier 60, IDC, should receive 20% of the calls. In addition, assume that originating carrier 30 has designated that carrier 60, IDC, should be the overflow carrier for carrier 40, KDD; carrier 40, KDD, and carrier 60, IDC, should be the overflow carriers for carrier 50, ITJ; and carrier 50, ITJ, should be the overflow carrier for carrier 60, IDC.

Thus, as illustrated in FIG. 3C, an appropriate carrier treatment table 360 for the proportional (%) routing option will include rows, such as rows 344, 348, 352, associated with each designated terminating carrier 40, 50, 60. The FAI value of each designated terminating carrier will be indicated in the first column 304. The entry in the Routing Table Pointer column 312 will identify the appropriate routing table, such as table 410 or 430, as discussed below relative to FIGS. 4A and 4B, for routing calls to the associated terminating carrier. The Allocated Percentages (%) column 308 will be populated with the percentages indicated by the originating carrier 30. The Overflow Carriers column 316 can be optionally populated for each indicated terminating carrier with the FAI values of the overflow carriers to be tried in order if a route is unavailable to the initially selected carrier.

As indicated above, each carrier treatment table 320, 340, 360 includes a column 312 containing, for each listed terminating carrier, a pointer to the routing table, such as the routing tables 410, 430, to be utilized in routing the call to the indicated terminating carrier. A routing table 410 for use by an originating gateway switch, such as gateway switch 100, in routing a call to a particular terminating carrier, such as terminating carrier 40, KDD, is illustrated in FIG. 4A.

In the preferred embodiment, the routing table 410 includes a column 415 containing identification numbers for each terminating gateway switch 110, 120, 130, 140 having a direct route to the respective terminating carrier 40. In addition, the routing table 410 will include a column 420 for allocating calls among the terminating gateway switches 110, 120, 130, 140, on a percentage basis specified by the transit carrier. A row, such as rows 425, 430, 435, 440, is provided for each terminating gateway switch, such as switches 110, 120, 130, 140, having a direct route to the terminating carrier 40.

A terminating gateway switch 110, 120, 130, 140 will have, by definition, at least one direct route to the respective terminating carrier via one of its own trunk subgroups. Thus, a routing table 430 appropriate for use by a terminating gateway switch, such as switch 110, in routing a call to a particular terminating carrier, such as terminating carrier 40, KDD, is shown in FIG. 4B.

The routing table 430 will include a column 440 containing identification numbers that identify each possible route to the respective terminating carrier, such as terminating carrier 40, KDD, from the switch 110. The routing table 430 will have a row, such as row 450, corresponding to the trunk subgroup 150 of switch 110 that provides a direct route to the terminating carrier 40. In addition, the routing table 430 will include rows, such as rows 460, 465, 470, corresponding to each of the other terminating gateway switches 120, 130, 140 having a direct route to the respective terminating carrier 40. The routing table 430 will also include a column 445 for allocating calls among the listed routes on a percentage basis, which has typically been specified by the transit carrier. It is noted that, where possible, a terminating gateway switch 110 will initially attempt to route a call by means of its own trunk subgroup 150 before utilizing another terminating gateway switch 120, 130, 140 to route the call.

A terminating country list 500, illustrated in FIG. 5, is preferably maintained by each originating gateway switch 100. The terminating country list 500 provides the originating gateway switch 100 with default information for routing calls to each terminating country, in the event that an originating carrier has not previously specified how a call to the respective terminating country should be routed. It is noted that the originating gateway switch would generally utilize this same default information to route calls that originate within the transit network.

As illustrated in FIG. 5, a terminating country list 500 will include a Terminating Country Code (CC) column 510, a Default Routing Information column 515 and a Single Carrier Flag column 520. A row, such as rows 530, 540, 550, 560, is provided for each particular terminating country, such as country 65, indexed by the appropriate terminating country code (CC).

The entry in the Default Routing Information column 515 for each terminating country will identify the particular terminating gateway switch or switches 110, 120, 130, 140, having direct routes to the associated terminating country, such as country 65. If the transit network 10 is connected to a particular terminating country by means of only a single terminating gateway switch, such as countries 35, 80 in the illustrated embodiment of FIG. 1, then the associated entry in the Default Routing Information column 515 will preferably list the identification number of the respective terminating gateway switch.

If, however, the transit network 10 is connected to the particular terminating country by a plurality of terminating gateway switches 110, 120, 130, 140, such as for country 65, the entry in the Default Routing Information column 515 will be a pointer to a default routing table. The routing table will list the identification number of each terminating gateway switch having a direct route to the respective terminating country, similar to the routing table 410 illustrated in FIG. 4A, and will allocate the calls among the plurality of switches.

The entry in the Single Carrier flag column 520 indicates whether the associated terminating country is served by only a single carrier. A first predetermined value in each entry indicates that the terminating country is served by a single carrier, while a second predetermined value indicates that the terminating country is served by a plurality of carriers.

Figure 6:
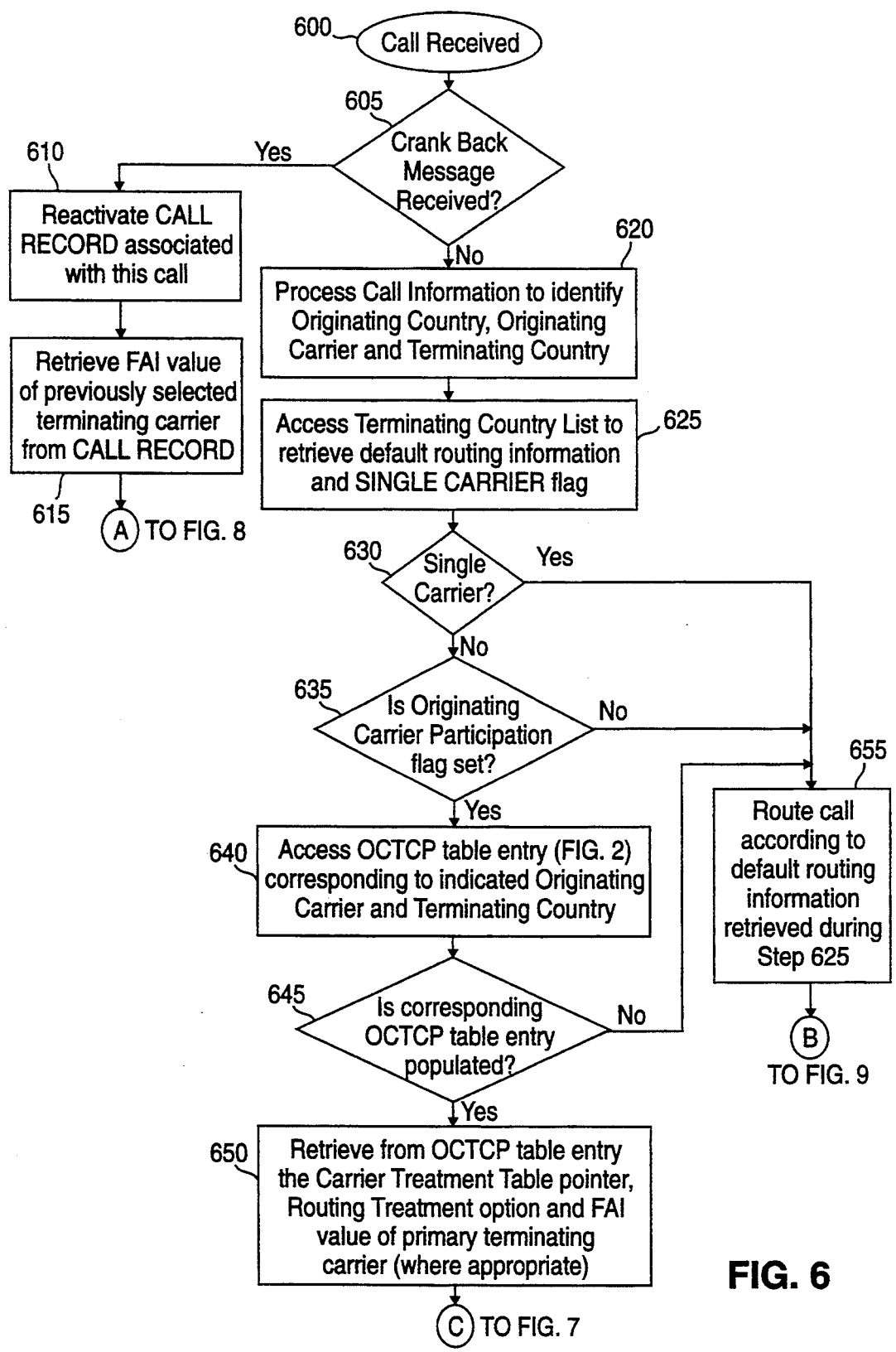
FIGS. 6 through 9, collectively, are a flow chart describing an exemplary method according to the present invention as utilized by an originating switch in routing an international transit call.

As illustrated in FIG. 6, the processes embodying the principles of the present invention will be entered at step 600 upon receipt of a call at an originating gateway switch 100.

International transit calls are received at an originating gateway switch 100 from two sources. First, international transit calls will be directly received from an originating country, such as country 35. In addition, international transit calls that have been previously routed by an originating gateway switch 100 to a terminating gateway switch 110, 120, 130, 140 may be returned or "cranked back", to the originating gateway switch 100 by the terminating switch if the initial routing attempt is unsuccessful. Thus, a test is initially performed at step 605 to determine if the process has been entered in response to the originating gateway switch 100 receiving a crank back message.

If it is determined during step 605 that a crank back message has been received, this is not the first attempt to route this international transit call. Program control will pass to a sequence of steps beginning with step 610, described further below, in order to determine if an alternate route is listed in the routing table for the initially selected terminating carrier.

If it is determined during step 605 that a crank back message has not been received, this is the first attempt at routing this international transit call. The information received with the call will be processed during step 620 to identify the originating country and carrier, as well as the terminating country, in the manner described above.

Thereafter, the originating gateway switch will access the appropriate row, such as row 550, in the terminating country list 500, illustrated in FIG. 5, during step 625 to retrieve the default routing information found in column 515 and the Single Carrier flag found in column 520 for the indicated terminating country, such as country 65. The default routing information will be utilized only if the originating carrier has not designated specific routing information to be utilized in routing calls to this terminating country, as determined below.

Program control will then pass to step 630, where the originating switch 100 will test the retrieved Single Carrier flag to determine if the terminating country is served by a single carrier.

Figure 9:
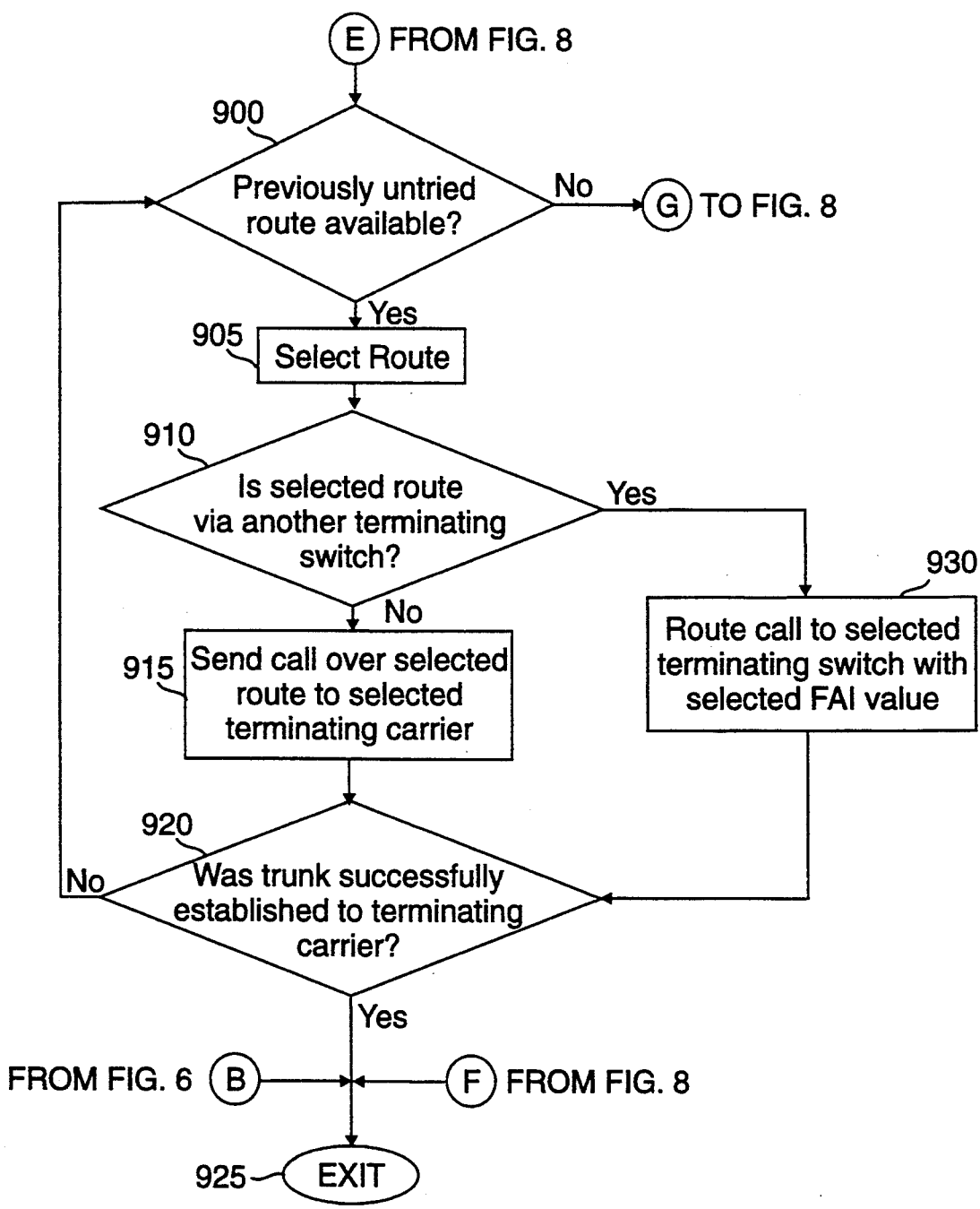

If it is determined during step 630 that the terminating country is served by only a single carrier, program control will pass to step 655 so that the international transit call may be routed in a known manner according to the default routing information retrieved during step 625. Thereafter, the process will be exited at step 925 (FIG. 9).

If it is determined during step 630 that the terminating country is served by a plurality of carriers, the originating gateway switch 100 must determine which terminating carrier among the plurality of carriers in the terminating country should handle the call. The originating switch 100 will then perform a test during step 635 to determine if the Originating Carrier Participation (OCP) flag has been set for the respective originating carrier, in the manner described above. If the OCP flag has not been set, the originating carrier has not designated specific routing treatment for any terminating country. Thus, the default routing information that was processed during step 625 will be utilized in a known manner during step 655 to route the call to the terminating country. Thereafter, the process will be exited at step 925 (FIG. 9).

If it is determined during step 635 that the OCP flag has been set, the originating carrier has designated routing information for at least one terminating country. Further processing must be performed by the originating switch 100 during steps 640 and 645 to determine if the originating carrier has designated specific routing information for the particular terminating country associated with the call.

The originating switch 100 will access the OCTCP table entry, such as entry 265, corresponding to this OCTCP during step 640. Thereafter, the originating switch will determine during step 645 if the OCTCP table entry is populated. If the entry in the OCTCP table is unpopulated, the originating carrier has not designated specific routing treatment for this terminating country, and the call should be routed in a known manner during step 655 in accordance with the default routing information that was retrieved during step 625. Thereafter, the process will be exited at step 925 (FIG. 9).

Figure 7:
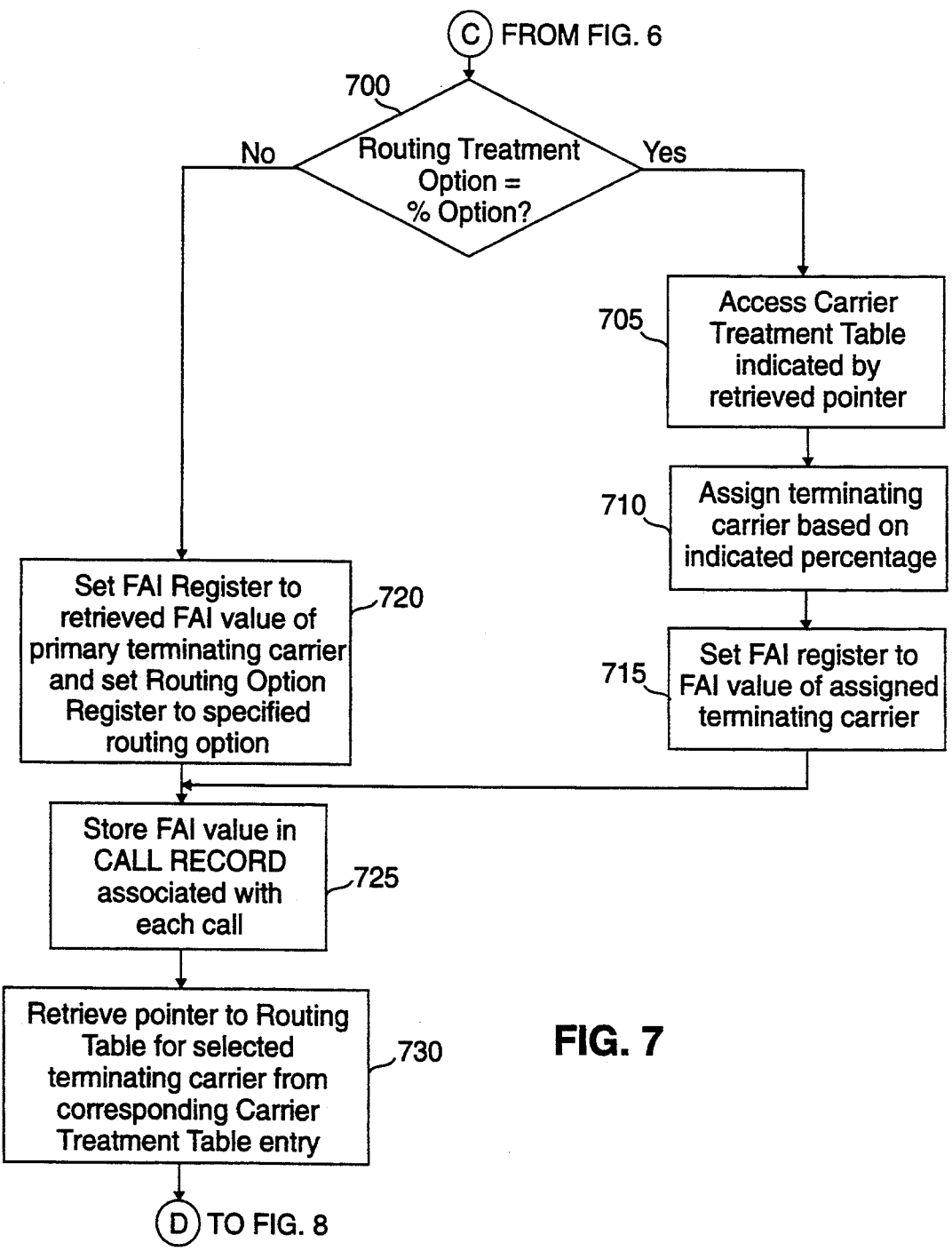

If it is determined during step 645 that the entry in the OCTCP table is populated, the originating carrier has previously designated specific routing information for this terminating country that should be applied in routing this call. During step 650, the originating switch will retrieve from the OCTCP table entry, such as entry 265, the pointer to the appropriate carrier treatment table, the specified routing treatment option, and the FAI value of the primary terminating carrier, where appropriate. Process control will then proceed to step 700 (FIG. 7).

A test is performed during step 700 to determine if the originating carrier associated with the call has specified the proportional (%) routing option for this terminating country, as indicated by the value retrieved from cell 265b of the OCTCP entry 265.

If it is determined during step 700 that the originating carrier has specified the proportional (%) routing option, a terminating carrier will be selected according to the allocated percentages specified by the originating carrier. The originating switch 100 will then access, during step 705, the carrier treatment table 360, illustrated in FIG. 3C, indicated by the pointer retrieved during step 650 (FIG. 6).

The originating switch will then assign, during step 710, the terminating carrier based on a process that results in the relative frequency of initial assignments to each designated carrier being equal to that carrier's initial attempt probability for a statistically significant number of calls, as listed in the carrier treatment table 360 (FIG. 3C). Thereafter, during step 715, the resulting FAI value of the selected terminating carrier is stored in an FAI register.

If the test result of step 700 is NO, the originating carrier has selected either the mandatory (M) or preferred (P) routing option for this terminating country. The mandatory (M) and preferred (P) routing options confine, at least initially, all routing searches to direct routes between the transit carrier and the designated primary terminating carrier. The FAI value of the primary terminating carrier was retrieved by the originating switch from the appropriate OCTCP table entry 265c during step 650 (FIG. 6). During step 720, the originating switch 100 will set the terminating carrier FAI register to the retrieved FAI value of the primary terminating carrier and the routing option register will be set to the routing option that has been specified by the originating carrier.

During step 725, the FAI value of the selected terminating carrier will be stored in a Call Record associated with each call, for use in the event of a crank back, discussed further below.

Figure 8:
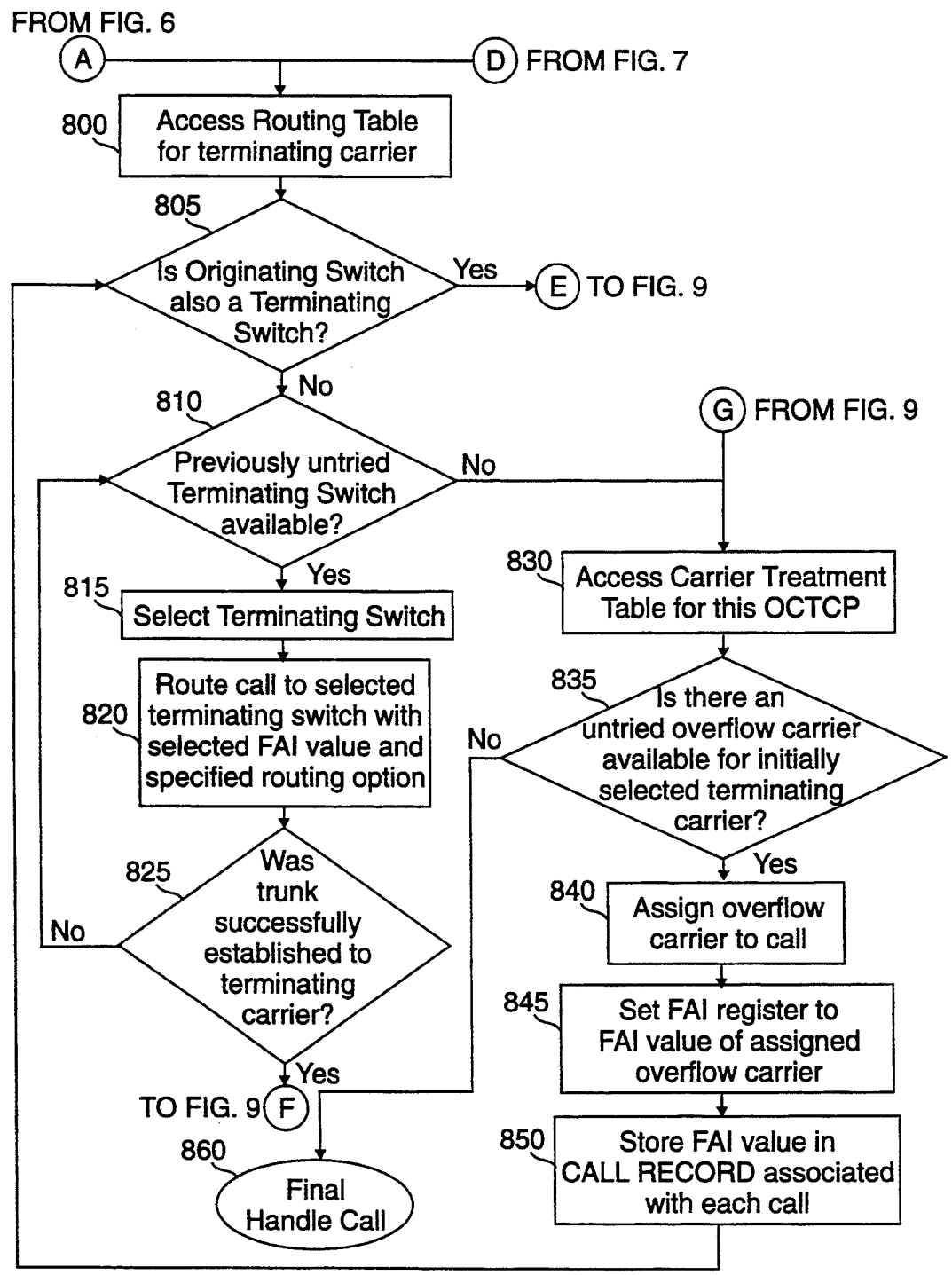

The originating switch will access during step 730 the carrier treatment table indicated by the pointer retrieved in step 650 and retrieve from column 312 the pointer to the routing table containing information on routing the call to the selected terminating carrier. Process control will then proceed to step 800 (FIG. 8).

Once the terminating carrier has been selected by the originating switch, the originating switch must then determine the appropriate terminating gateway switch 110, 120, 130, 140 that should be utilized to forward the call to the selected terminating carrier.

During step 800, the originating switch 100 will access the routing table for this terminating carrier, such as a routing table 410 (FIG. 4A), indicated by the pointer retrieved during step 730.

It is noted that in certain cases a switch may be both an originating gateway switch and a terminating gateway switch for the same international transit call, such as when a terminating gateway switch 110 receives a call from a carrier 75 in an originating country 80 that is destined for a terminating country 65, as illustrated in FIG. 1.

Thus, an originating switch must determine during step 805 if it is also a terminating gateway switch for the call by reviewing the routing table, such as table 410 or 430, stored by the switch for the terminating carrier. The originating switch will be a terminating switch for the call if the routing table 410 or 430 indicates that one or more trunk subgroups of the respective switch provide a direct route to the selected terminating carrier, such as the routing table 430 which is maintained by switch 110 for calls destined for the terminating carrier 40, illustrated in FIG. 4B.

If it is determined during step 805 that the originating switch is also a potential terminating switch for the selected terminating carrier, process control will pass to step 900 (FIG. 9), discussed further below.

If it is determined during step 805 that the originating switch is not a potential terminating switch for the selected terminating carrier, then the originating switch will perform a test during step 810 to determine if there remains at least one previously untried terminating switch in the routing table, such as table 410 (FIG. 4A), for the currently selected terminating carrier.

If there is a remaining previously untried terminating switch, the originating switch will select, during step 815, a terminating switch in accordance with the indicated initial try probabilities listed in the routing table, such as table 410 (FIG. 4A). The originating switch will employ a selection process during step 815 that will result in the relative frequency of selection of each terminating switch being equal to the indicated initial try probability for a statistically significant number of calls.

The originating switch will attempt during step 820 to route the call to the selected terminating switch. As a part of step 820, the originating switch will insert the FAI value of the selected terminating carrier retrieved from the FAI register, in the appropriate field of the call information associated with the call. The FAI value may be inserted in the Foreign Administration Identifier (FAI) field of the Transit Network Selection parameter of the well-known CCS7 ISUP (ISDN User Part) IAM (Initial Address Message) message.

The originating switch 100 will perform a test at step 825 to determine if a trunk was successfully established to the selected terminating carrier. If the trunk was successfully established, the originating switch 100 will exit the process at step 925 (FIG. 9).

If, however, the trunk was not successfully established to the selected terminating carrier, process control will return to step 810 to attempt to select another terminating switch, in the manner described above.

If the test performed in step 810 determines that there are no remaining previously untried terminating switches, the call cannot be completed to the initially assigned carrier. Thus, it is necessary during steps 830–850 to select an alternate, or overflow, carrier to which the originating switch will attempt to complete the call.

In attempting to select an overflow carrier, the originating switch again accesses the carrier treatment table, such as tables 320, 340, 360, associated with this originating carrier and terminating country during step 830 to determine if the originating carrier 30 has specified how calls should be handled in the event a call could not be completed to the initially selected carrier. Based on the information in the carrier treatment table, such as tables 320, 340, 360, the originating switch 100 determines during step 835 whether an overflow carrier has been specified.

It is noted that for the mandatory (M) option, an overflow carrier will never be available. For the preferred (P) option, the originating switch can continue down the list of designated terminating carriers until the call is successfully routed or final handled. For the proportional (%) option, the originating carrier can optionally designate overflow carriers.

If it is determined during step 835 that an overflow carrier has not been designated to handle calls in the event that a call cannot be routed to the initially selected carrier, the call cannot be completed and will be final handled, i.e., terminated, during step 860.

If it is determined during step 835 that an overflow carrier has been designated, the originating switch 100 will assign an overflow carrier to the call during step 840 by assigning the next previously untried terminating carrier listed in the appropriate entry in the overflow column 316 of the carrier treatment table, such as tables 340, 360, for the initially selected terminating carrier.

During step 845, the originating switch 100 will set the terminating carrier FAI register to the FAI value of the selected overflow terminating carrier. During step 850, the FAI value of the selected terminating carrier will also be stored in the Call Record associated with each call, for use in the event of a crank back, discussed further below. Process control will return to step 805 to determine if a route is available to the presently selected overflow carrier, and will continue as described above.

If the originating switch determines during step 805 that it is also a potential terminating gateway switch, such as where switch 110 is processing a call received from carrier 75 in originating country 80 that is destined for terminating country 65, control will pass to step 900 (FIG. 9). The originating/terminating switch, such as switch 110, will determine during step 900 whether a previously untried route is available to the selected terminating carrier.

If it is determined during step 900 that there are no previously untried routes available to the selected terminating carrier, process control will return to step 830 (FIG. 8) to attempt to select an overflow carrier, in the manner described above.

If the originating/terminating switch, such as switch 110, has a previously untried route available, the switch will select a route to the terminating country during step 905, based on the percentages indicated in the routing table, such as table 430 (FIG. 4B), as discussed above. As seen from the routing table illustrated in FIG. 4B, the originating/terminating switch 110 may route the call to the terminating country by means of its own trunk subgroup 150 which is directly connected to the selected terminating carrier, such as carrier 40, KDD, or by means of another terminating switch 120, 130, 140 having a direct route to the selected terminating carrier. Clearly, selection of trunk subgroup 150 from the originating/terminating switch 110 will provide the more direct and preferred route.

The originating/terminating switch 110 will determine during step 910 whether the selected route is via a trunk subgroup 150 on the present originating/terminating switch 110, or via another terminating switch 120, 130, 140. If the originating/terminating switch 110 selected its own trunk subgroup 150 to route the call to the presently selected terminating carrier, the call will be transmitted during step 915 over the selected route to the selected terminating carrier. The originating/terminating switch 110 will test during step 920 whether the trunk was successfully established to the selected terminating carrier.

If the trunk was successfully established to the selected terminating carrier, the process is exited at step 925. If, however, the trunk was not successfully established to the selected carrier, control will return to step 900 to determine if the originating/terminating switch has another previously untried route available to the initially selected terminating carrier, and the process will continue in the manner described above.

If the originating/terminating switch 110 determined during step 910 that it selected another terminating switch 120, 130, 140 to route the call as opposed to its own trunk subgroup 150 process control will proceed to step 930. The originating/terminating switch 110 will then attempt to route the call to the selected terminating switch. As a part of step 930, the originating/terminating switch 110 will insert the FAI value of the selected terminating carrier retrieved from the FAI register in the appropriate field of the call information associated with the call, in the manner described above. Control will again return to step 920 for a determination of whether the trunk was successfully established, in the manner described above.

Figure 10:
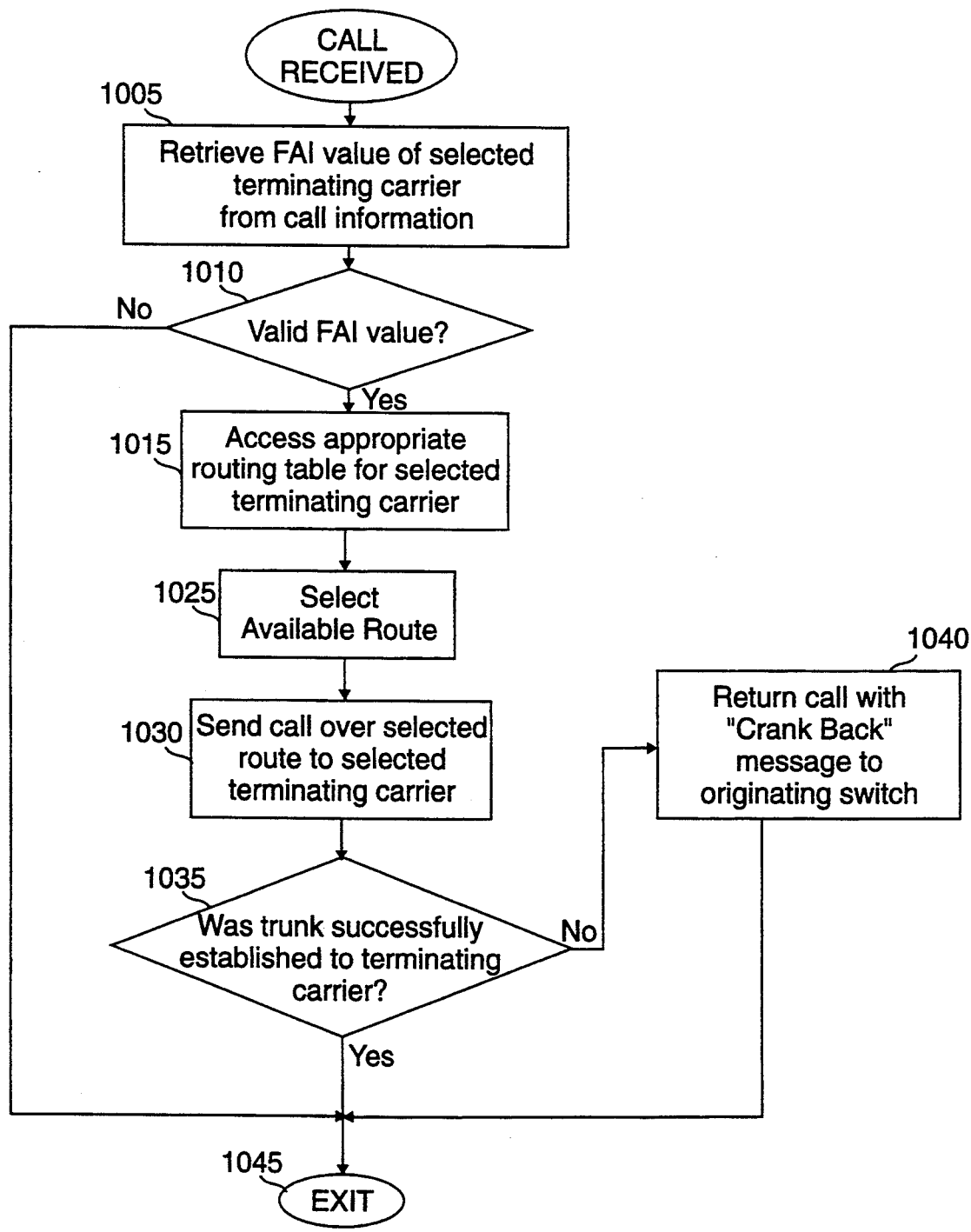
FIG. 10 describes the processing steps used by a terminating switch in routing an international transit call in accordance with the present invention.

Once the originating gateway switch 100 has successfully routed the call to a terminating gateway switch, such as switch 110, 120, 130, 140, the call will be received by the selected terminating gateway switch, such as switch 110, 120, 130, 140. Upon receipt of the call, the terminating switch will enter the processes embodying the principles of the present invention at step 1000 (FIG. 10).

The terminating switch 110, 120, 130, 140 will retrieve during step 1005, the FAI value of the selected terminating carrier from the appropriate field of the received call information.

The terminating switch 110, 120, 130, 140 will then test, during step 1010, the received FAI value of the selected terminating carrier to determine if the FAI value corresponds to a valid terminating carrier in the respective terminating country. If the received FAI value is invalid, the process is exited in step 1045. If the received FAI value is valid, process control will proceed to step 1015 to attempt to route the call.

The terminating switch will access during step 1015 the appropriate routing table, such as the routing table 430 illustrated in FIG. 4B, based on the received FAI value for the selected terminating carrier. The terminating switch will select during step 1025, an available route over which to complete the call to the assigned carrier. The terminating switch will send the call to the assigned carrier during step 1030, via the selected route.

The terminating switch will then perform a test during step 1035 to determine whether the trunk was successfully established to the selected terminating carrier.

If the trunk was successfully established to the selected terminating carrier, the process is exited at step 1045. If, however, the trunk was not successfully established to the selected carrier, control will proceed to step 1040.

Since the terminating switch cannot complete the call to the assigned carrier, process control will proceed to step 1040, where the terminating switch will return the call, along with a crank back message, to the originating switch 100 from which it received the call, as identified in the information received with the call. The terminating switch will then exit the process during step 1045.

Upon receipt of the cranked back call, the originating switch 100 will again enter the processes embodying the principles of the present invention at step 600 (FIG. 6). The originating switch will determine, during step 605, that a crank back message was received, indicating that this is not the first attempt to route this international transit call. Program control will pass to a sequence of steps beginning with step 610, in order to determine if an alternate route is listed in the routing table for the initially selected terminating carrier. During step 610, the originating switch will reactivate the Call Record that was initially generated for this call. The originating switch 100 will then retrieve from the Call Record during step 615 the FAI value of the initially selected terminating carrier.

Process control will then proceed to step 800 (FIG. 8) where the originating gateway switch 100 will again access the routing table for the selected terminating carrier, and continue in the manner described above, until the call is successfully routed to the terminating country or final handled. The originating switch 100 will first attempt to route the call to the initially selected terminating carrier, but via a different terminating switch, before utilizing any designated overflow carriers.

In one embodiment, the originating switch 100 maintains a number of peg counts associated with each terminating carrier for data recording purposes. An Initial Attempt Carrier Peg Count may be provided for each originating carrier and indicated terminating carrier pair to monitor the number of times, within a predefined period of time, that the associated terminating carrier was the initially assigned carrier for a call from the associated originating carrier. Thus, each time a terminating carrier is the initially selected carrier, the appropriate Initial Attempt Carrier Peg Count is incremented for the initially assigned terminating carrier. The Initial Attempt Carrier Peg Count will be incremented once for each call.

An Initial Overflow Peg Count may also be provided for each originating carrier and indicated terminating carrier pair to monitor the number of times, within a predefined period of time, that a call from the associated originating carrier could not be completed to the associated terminating carrier when it was selected to initially receive the call. Thus, this Initial Overflow Peg Count should be incremented following a determination that no terminating gateway switches are available to the initially selected terminating carrier. The Initial Overflow Peg Count will be incremented a maximum of one time for each call.

In addition, a set of Successive FAI Peg Counts are preferably provided for monitoring overflow attempts to each successive overflow terminating carrier listed in the Overflow entry of a Carrier Treatment Table for a given terminating carrier and originating carrier pair. Thus, the Successive FAI peg count corresponding to a particular overflow carrier for a given initial terminating carrier should be incremented each time the associated overflow carrier is selected to be the overflow carrier. Additional peg counts can be provided to monitor other events as well, including the number of times within a predefined period of time that a call is final handled.

An alternate embodiment allows carrier treatment table 320 associated with the mandatory (M) routing option, as illustrated in FIG. 3A, to be shared by different OCTCPs in certain cases in order to conserve switch memory resources. A carrier treatment table 320 may be shared by a group of originating carriers who have all selected the mandatory (M) option for a particular terminating country and who have each designated a different terminating carrier for the respective terminating country. As discussed above, for the mandatory (M) routing option, the OCTCP table entry 210c for each originating carrier and terminating country pair includes the FAI value of the designated primary terminating carrier. Thus, when accessing the carrier treatment table 320 where the mandatory (M) option has been designated, the FAI value of the primary terminating carrier, which has been previously retrieved from the OCTCP table entry, may be utilized as an index into the appropriate row of the carrier treatment table 320.

For example, a plurality of originating carriers, i.e., carriers A, B and C, which may be from different originating countries, who have all selected the mandatory (M) routing option may share a single table if they have each selected different terminating carriers in the respective terminating country. The value of the primary terminating carrier retrieved from the OCTCP table allows the originating gateway switch to go directly to the carrier treatment table row associated with the indicated primary terminating carrier.

Figure 11:
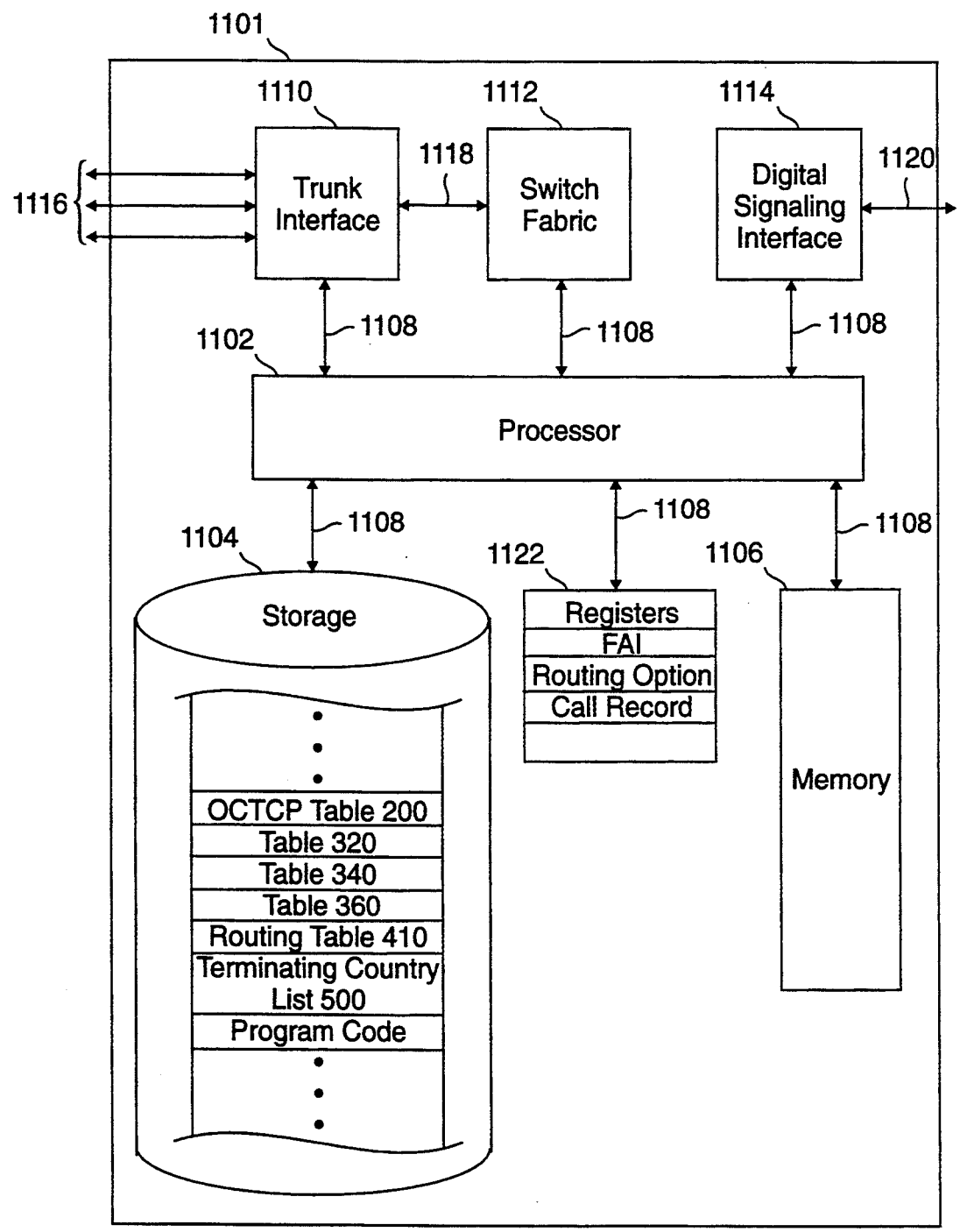
FIG. 11 illustrates a switch, in simplified block diagram form, suitable for use in the network of FIG. 1.

The operation of an illustrative originating or terminating gateway switch, preferably embodied as AT&T's 4ESS ™ telecommunications switch, is discussed relative to FIG. 11. A switch 1101 is shown in simplified block diagram form in FIG. 11, which may serve as an originating gateway switch 100 or a terminating gateway switch 110, 120, 130, 140. Switch 1101 is a stored program control switch. Long term storage 1104, registers 1122 and memory 1106 interface with processor 1102 via bus 1108.

As shown in FIG. 11, storage 1104 may include carrier treatment tables 320, 340, 360, OCTCP table 200, routing tables 410, 430, terminating country list 500, as well as the program code necessary to execute the processes described above in conjunction with FIGS. 6 through 10. Memory 1106 is for short term storage of data and programs. Registers 1122 are preferably maintained for temporary storage of Call Records and certain values, including the specified routing option and the FAI value of the selected terminating carrier corresponding to a call presently being processed by the switch 1101.

Switch 1101 also includes trunk interface 1110, switch fabric 1112 and digital signalling interface 1114. Trunk interface 1110 is connected to trunks 1116; processor 1102, via bus 1108; and switch fabric 1112, via link 1118. Trunk interface 1110 terminates each of trunks 1116 and can convey in-band signals to and from trunks 1116. Processor 1102 specifies the in-band signals supplied from trunk interface 1110 and it is supplied with the information contained in in-band signals received by trunk interface 1110. Switch fabric 1112 performs, under the control of processor 1102 via bus 1108, all the switching necessary to connect trunks 1116 to one another.

Digital signaling interface 1114 is a transceiver for communicating signaling messages in digital form over link 1120. Link 1120 connects switch 1101 to a separate network used for inter-switch communications. Messages destined to and from processor 1102 are communicated over bus 1108.

Either trunk interface 1110 or digital signaling interface 1114 can be used to send call information, including the FAI value, to another switch. It is digital signaling interface 1114 that would transmit or receive the ISUP messages described above.

It is to be understood that the embodiments and variations shown and described herein are illustrative of the principles of this invention only and that various modifications may be implemented by those skilled in the art without departing from the scope and spirit of the invention.

I claim:

1. A system for use by a transit carrier for allocating an international transit call received from an originating carrier among a plurality of carriers in a terminating country, said allocation system comprising:
   a computing system having a processor and storage means;
   means for retrieving from said originating carrier a specification of how calls destined for said terminating country should be allocated among said plurality of terminating carriers;
   a table in said storage means associated with said originating carrier and said terminating country;
   means for storing said retrieved specification in said table;
   said processor further comprising:
   means for identifying said originating carrier and said terminating country associated with said received international transit call;
   means for accessing said table associated with said originating carrier and said terminating country to retrieve said stored specification; and
   means for assigning one of said plurality of terminating carriers to receive said international transit call based upon said stored specification.

2. The allocating system according to claim 1, further including means for apportioning all international transit calls destined for said terminating country to one of said plurality of terminating carriers indicated by said originating carrier.

3. The allocating system according to claim 1, further including means for apportioning said international transit calls destined for said terminating country based on an order of preference indicated by said originating carrier for each of said plurality of terminating carriers in said terminating country.

4. The allocating system according to claim 1, further including means for apportioning said international transit calls destined for said terminating country among said plurality of terminating carriers based on percentages indicated by said originating carrier for each of said plurality of terminating carriers.

5. The allocating system according to claim 4, wherein said means for apportioning employs a process which ensures that the probability that any one of said plurality of terminating carriers will be said assigned terminating carrier is equal to a predetermined probability specified by said originating carrier for a statistically significant number of calls.

6. The allocating system according to claim 1, further including means for receiving from said originating carrier an indication of an overflow terminating carrier that may handle the call if there are no routes available to the initially assigned carrier.

7. A system for use in a telecommunications switch of a transit carrier for allocating an international transit call among a plurality of carriers in a terminating country, said international transit call being received by said transit carrier from an originating carrier in an originating country, said telecommunications switch employing a computing system having a processor and storage means, said allocation system comprising:
   means for receiving from said originating carrier a specification of how said international transit call should be allocated among said plurality of terminating carriers in said terminating country; and
   means for assigning said international transit call to one of said plurality of terminating carriers based on said received specification.

8. The allocating system according to claim 7, further including means for storing said received specification in a table in said storage means associated with said originating carrier and said terminating country.

9. The allocating system according to claim 8, wherein said means for assigning said call to a terminating carrier further includes means for accessing said table associated with said originating carrier and said terminating country to retrieve said stored specification.

10. The allocating system according to claim 7, wherein said means for assigning said call further includes means for apportioning all international transit calls destined for said terminating country to one of said plurality of terminating carriers indicated by said originating carrier.

11. The allocating system according to claim 7, wherein said means for assigning said call further includes means for apportioning said international transit calls destined for said terminating country based on an order of preference indicated by said originating carrier for each of said plurality of terminating carriers in said terminating country.

12. The allocating system according to claim 7, wherein said means for assigning said call further includes means for apportioning said international transit calls destined for said terminating country among said plurality of terminating carriers based on percentages indicated by said originating carrier for each of said plurality of terminating carriers.

13. The allocating system according to claim 12, wherein said means for apportioning employs a process which ensures that the probability that any one of said plurality of terminating carriers will be said assigned terminating carrier is equal to a predetermined probability specified by said originating carrier for a statistically significant number of calls.

14. The allocating system according to claim 7, wherein said means for assigning said call further includes means for reassigning said call to another terminating carrier if there are no routes available to the initially assigned carrier, said reassignment being based on an indication received from said originating carrier of an overflow terminating carrier that may handle the call.

15. A method for use in a telecommunications switch of a transit carrier for allocating an international transit call among a plurality of carriers in a terminating country, said international transit call being received by said transit carrier from an originating carrier in an originating country, said telecommunications switch employing a computing system having a processor and storage means, said allocation method comprising the steps of:

receiving from said originating carrier a specification of how said international transit call should be allocated among said plurality of terminating carriers in said terminating country; and assigning said international transit call to one of said plurality of terminating carriers based on said received allocation.

16. The allocating method according to claim 15, further including the step of storing said received specification in a table in said storage means associated with said originating carrier and said terminating country.

17. The allocating method according to claim 16, wherein said step of assigning said call to a terminating carrier further includes the step of accessing said table associated with said originating carrier and said terminating country to retrieve said stored specification.

18. The allocating method according to claim 15, wherein said step of assigning further includes the step of apportioning all international transit calls to one of said plurality of terminating carriers indicated by said originating carrier.

19. The allocating method according to claim 15, wherein said step of assigning further includes the step of apportioning said international transit calls based on an order of preference indicated by said originating carrier for each of said plurality of terminating carriers in said terminating country.

20. The allocating method according to claim 15, wherein said step of assigning further includes the step of apportioning said international transit calls based on percentages indicated by said originating carrier for each of said plurality of terminating carriers.

21. A method for use by a transit carrier for allocating an international transit call received from an originating carrier among a plurality of terminating carriers in a terminating country, said allocation method employing a computing system having a processor and storage means, said allocation method comprising the steps of:

receiving from said originating carrier a specification of how calls destined for said terminating country should be allocated among said plurality of terminating carriers;

creating a table in said storage means associated with said originating carrier and said terminating country;

storing said received specification in said table;

processing said received international transit call to identify said originating carrier and said terminating country;

accessing said table associated with said originating carrier and terminating country;

retrieving said stored specification from said accessed table; and assigning one of said plurality of terminating carriers to receive said international transit call based upon said stored specification.

22. The allocating method according to claim 21, wherein said step of assigning further includes the step of apportioning all international transit calls to one of said plurality of terminating carriers indicated by said originating carrier.

23. The allocating method according to claim 21, wherein said step of assigning further includes the step of apportioning said international transit calls based on an order of preference indicated by said originating carrier for each of said plurality of terminating carriers in said terminating country.

24. The allocating method according to claim 21, wherein said step of assigning further includes the step of apportioning said international transit calls based on percentages indicated by said originating carrier for each of said plurality of terminating carriers.

25. A method for use in a first telecommunications switch of a telecommunications network of a transit carrier for routing an international transit call to a terminating country having a plurality of terminating carriers, said international transit call being received at said first switch from an originating carrier in an originating country, said allocation method employing a computing system having a processor and storage means, said allocation method comprising the steps of:

assigning said international transit call to one of said plurality of terminating carriers in accordance with routing information that has been previously specified by said originating carrier;

identifying a second switch in said network which can directly complete said international transit call to said assigned terminating carrier; and routing said international transit call to said identified second switch with associated call information that includes an indication of said assigned terminating carrier.

26. The routing method according to claim 25, wherein said previously specified routing information is stored in a table in said storage means associated with said originating carrier and said terminating country.

27. The routing method according to claim 26, wherein said step of assigning said call to a terminating carrier further includes the step of accessing said table associated with said originating carrier and said terminating country to retrieve said previously specified routing information.

* * * * *